US 8,254,956 B2

(12) United States Patent
Lohi

(10) Patent No.: US 8,254,956 B2
(45) Date of Patent: Aug. 28, 2012

(54) METHOD, DEVICE ARRANGEMENT, TERMINAL AND COMPUTER SOFTWARE PRODUCT FOR DISTRIBUTING TELEMATIC DATA OF MOVING OBJECT

(75) Inventor: Hannu Lohi, Kello (FI)

(73) Assignee: Tracker Oy, Oulunsalo (FI)

( * ) Notice: Subject to any disclaimer, the term of this patent is extended or adjusted under 35 U.S.C. 154(b) by 380 days.

(21) Appl. No.: 12/477,229

(22) Filed: Jun. 3, 2009

(65) Prior Publication Data

US 2009/0305724 A1 Dec. 10, 2009

(30) Foreign Application Priority Data

Jun. 4, 2008 (FI) ...................................... 20085545

(51) Int. Cl.
*H04W 24/00* (2009.01)
*H04M 3/42* (2006.01)
(52) U.S. Cl. ................... 455/456.1; 455/414.1; 455/457
(58) Field of Classification Search ............. 342/357.07, 342/357.75, 357.55, 21, 385, 450, 357.64, 342/417; 340/999, 426.19, 995.13, 573.4, 340/8.1, 572.1, 539.18; 455/456.1, 456.5, 455/414.1, 457, 456.3, 432.1, 420
See application file for complete search history.

(56) References Cited

U.S. PATENT DOCUMENTS

| | | | |
|---|---|---|---|
| 6,441,778 B1 * | 8/2002 | Durst et al. ............... | 342/357.55 |
| 6,674,368 B2 | 1/2004 | Hawkins et al. | |
| 7,155,238 B2 * | 12/2006 | Katz .......................... | 455/456.1 |
| 7,983,835 B2 * | 7/2011 | Lagassey ..................... | 701/117 |
| 2001/0026240 A1 * | 10/2001 | Neher ........................ | 342/357.07 |

FOREIGN PATENT DOCUMENTS

| | | |
|---|---|---|
| CN | 1790938 | 6/2006 |
| EP | 1 619 516 | 1/2006 |

OTHER PUBLICATIONS

Finnish Search Report dated Mar. 27, 2009, from corresponding Finnish application.

* cited by examiner

*Primary Examiner* — Kiet Doan
(74) *Attorney, Agent, or Firm* — Young & Thompson

(57) ABSTRACT

A positioning method, a tracker's terminal (13), a positioning arrangement and a computer software product for tracking an object (11a), such as a dog. The method uses GPS positioning. The GPS position information of the object (11a) is transmitted through either a circuit switched digital radio network (10b) or an analogue radio link to the tracker's terminal (13). The tracker's terminal includes a software application via which the received position information can, when desired, be transmitted though a packet switched network (10a) to at least one other tracker's terminal (22, 23).

18 Claims, 4 Drawing Sheets

METHOD, DEVICE ARRANGEMENT, TERMINAL AND COMPUTER SOFTWARE PRODUCT FOR DISTRIBUTING TELEMATIC DATA OF MOVING OBJECT

The invention relates to a method, a device, a device arrangement and a computer software product for distributing telematic data of a moving object, such as a dog, through an alternative transmission path.

BACKGROUND OF THE INVENTION

There are several tracking arrangements for tracking a moving object, such as a hunting dog. A dog can be equipped with for example a radio transmitter, the analogue signal transmitted by which is tracked with a suitable directional antenna. With this arrangement, the direction of the dog is discovered and, based on the strength of the received signal, an estimate, however not very precise, can be made as to how far the dog is with its radio transmitter.

Also a tracking solution is known in which satellite-based GPS (Global Positioning System) positioning and some other wireless digital data transmission network, for example GSM (Global System for Mobile communications) network, is used. An example of such system is shown in FIG. 1a. In the example of FIG. 1a, at least a device 12 carried by an object 11a to be tracked contains a GPS locator. The transmitter contained in the device 12, carried by the object 11a to be tracked, sends the result of the positioning made by means of the GPS either as an SMS (Short Message Service) message or as a data call to a wireless terminal 13 of the tracker through a digital data transmission network 10, reference numerals 12a, 100 and 13a. The used data transmission network can for example be a GSM network. A tracker's terminal 13 may also use a map base representing the area, whereby the position of the dog to be tracked can be expressed on said map.

The system of FIG. 1a can also work for example on a request basis whereby the tracker's terminal 13 sends a request for positioning to the device 12 of the object 11a to be tracked. The device 12 carried by the object 11a to be tracked replies to it by means of an SMS message containing the GPS positioning information.

This arrangement is not entirely real-time, but instead, the tracker can use either the result of a previous positioning or else the tracker will have to perform a new positioning which takes time and increases tracking costs, since every sent SMS message costs money. Additionally, with one SMS message, the position information can be transmitted only to one tracker's terminal 13. If several persons wish to track the object 11a with their own terminals, a system has to be created wherein the device 12 of the object 11a being tracked sends a separate SMS message to each terminal.

If the positioning information is wished to be transmitted to several tracking devices simultaneously, either a separate SMS message has to be sent to each tracking device or a data call connection has to be established. The SMS messages are always charged on the basis of sent messages.

Thus, such tracking arrangement is rather expensive, since the price defined by the operator for messages to be transmitted has to be paid for each positioning information sent.

FIG. 1b describes a solution wherein a device 14 carried by an object 11a to be tracked uses GPS positioning. The device 14 of the object to be tracked 11a sends the positioning result by means of a radio transmitter as an RF transmission 15a directly to the tracker's device 15. The connection can be established for example as a radio link using a so-called FRS (Family Radio Service) service. In the FRS service, the data is transmitted using an FM modulated carrier wave on UHF (Ultra High Frequency) frequency. The used radio phone is a kind of "Walkie talkie" radio phone. The number of channels is limited in the FRS15 service, and also the range of the radio communication is in practice limited to less than 3 km.

In this system, distribution of the telematic data to the terminals located outside the range becomes problematic.

Also tracking solutions are known in which a device 12 carried by an object to be tracked can connect also to a packet switched cellular network, for example a GPRS (General Packet Radio Service) network. In such system, the telematic data measured by the device 12 is sent to a server wherefrom it can be sent reasonably in real time to the tracker's device. Furthermore, the positioning information can be sent from the server to an unlimited number of trackers' devices through said packet switched network.

Although GPRS based solutions are becoming more and more common, users have a large number of devices in which the only data transmission possibility is a text message or a circuit switched data call that are sent by means of a point-to-point radio connection. In these systems, the sending device, for example a locator, has to send the telematic data to each receiver separately. This incurs additional costs and increases current consumption.

In the RF based transmission path, the telematic data cannot be transmitted to the receivers outside the radio range, and additionally, each receiver must contain a radio unit that may be even rather rare.

Also tracking solutions are known in which the device being tracked send its telematic data directly to a server by means of a text message, wherefrom the server forwards the telematic data by means of packet data to the viewing terminals. In these arrangements, the extensive cost of SMS gateway services becomes problematic. The owner of the server has to pay for each incoming message. Alternatively, a text message receiving modem can be connected to the server. In this case, the limited performance of the modem forms a problem. It cannot receive messages arriving constantly from a large number of devices. In the existent text message based solutions, the position information reply is sent to the requester. In this case, the server should request for a position by means of a text message from the locator on the object to be tracked, whereby the message cost would double.

It is an object of the invention to present a method and an arrangement with which the telematic data of an object to be tracked can be distributed cost-effectively with more trackers also in regard to the devices to be tracked that cannot connect to a packet switched radio network.

SUMMARY OF THE INVENTION

The objectives of the invention are met with an arrangement in which the telematic data of an object to be tracked, for example a GPS positioning information, is transmitted first to a tracker's device by using either a text message or a data call of a cellular network or a direct RF connection. As a cellular network, for example a GSM network can be used and as an RF link, for example FRS radio link can be used. In a second stage, the tracker's device forwards the telematic data of the object to be tracked it has received through a packet switched network to an unlimited number of other tracker's devices. As a packet switched network, for example GPRS network can be used.

An advantage of the invention is that a device using any data transmission technique can be used as the positioning device carried by the object to be tracked.

A further advantage of the invention is that real-time positioning information of the object to be tracked can be transmitted cost-effectively by using a generally available packet switched connection to several trackers' devices even though the device of the object to be tracked would be suitable for transmitting the position information to only one tracker's device.

A further advantage of the invention is that the positioning information can be transmitted to several tracking devices simultaneously through a cellular network.

A further advantage of the invention is that the tracking costs are low also in the cases where the positioning information is transmitted to several different devices.

The method according to the invention for distributing the position information of an object to be tracked is characterized in that
- it is checked if the received position information is set to be distributed with at least one other terminal, and
- the received position information of the object is forwarded through a packet switched network to at least one other terminal, if the position information of the object is set to be distributed.

The positioning arrangement according to the invention for distributing the position information of an object to be tracked is characterized in that the tracker's terminal comprises
- means for determining the position information to be distributed and
- means for forwarding the received position information of an object through a packet switched network to at least one other terminal, if the position information of the object is set to be distributed.

The terminal of a radio network according to the invention in which it is possible to distribute the position information of an object to be tracked, is characterized in that it comprises
- means for checking the distribution setting of the position information contained in the telematic data and
- means for forwarding the position information contained in the received telematic data of the object through a packet switched network to at least one other terminal.

The software product according to the invention by means of which it is possible to distribute position information to several terminals is characterized in that it comprises
- computer program means for checking if the received position information is set to be distributed with at least one other terminal, and
- computer program means for forwarding the received position information of the object through a packet switched network to at least one other terminal, if the position information of the object is set to be distributed.

Some advantageous embodiments of the invention are presented in the dependent claims.

The basic idea of the invention is the following: A tracking device is attached to an object to be tracked, such as a dog, which device advantageously comprises a GPS locator, a terminal of a cellular network, such as a GSM network, or an analogue radio transmitter. The positioning of the object is performed by means of a satellite locator, such as a GPS locator, either at certain intervals or as constantly functioning. Satellite positioning information is advantageously transmitted by using either a circuit switched digital data transmission connection or an analogue radio link to a tracker's terminal. The tracker's terminal advantageously comprises a software application by means of which the GPS positioning information received through a circuit switched digital data link or an analogue radio link can be transmitted through a packet switched network to at least one other tracker's terminal. Advantageously, the positioning information of the object is transmitted through a packet switched network to a server that distributes the stored position information.

BRIEF DESCRIPTION OF THE DRAWINGS

In the following, the invention will be described in detail. In the description, reference is made to the appended drawings, in which

FIGS. 1a and 1b have been described in connection with the description of the prior art.

DETAILED DESCRIPTION OF THE PREFERRED EMBODIMENTS

In the following description, considered embodiments are merely exemplary, and one skilled in the art may find other ways to implement the invention. Although the specification may refer to "an", "one; or "some" embodiment(s) in several locations, this does not necessarily mean that each such reference is made to the same embodiment(s), or that the feature only applies to a single embodiment. Single feature of different embodiments may also be combined to provide other embodiments.

Figure 2A:
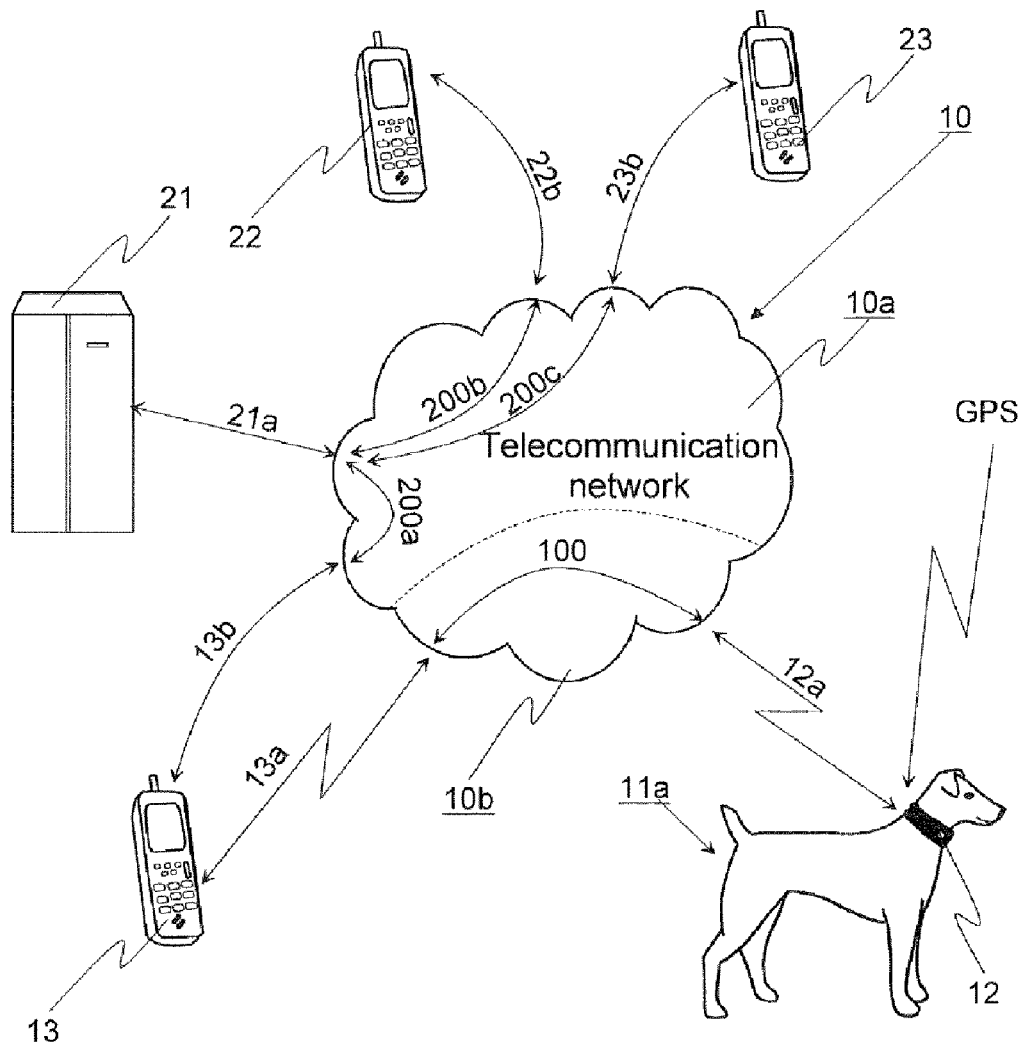
FIG. 2a shows by way of an example a tracking arrangement according to the invention.

The FIG. 2 shows by way of an example a tracking and positioning arrangement according to the invention. The reference numeral 10 describes a digital data transmission network that can be either circuit switched network 10b capable of transmitting text messages or data calls or a packet switched network 10a. The data transmission networks 10a and 10b can advantageously be parts of the same physical data transmission network, i.e. for example the data transmission network 10b can be a GSM network and the data transmission network 10a can be a GPRS service being implemented by means of a GSM main trunk. Reference numeral 13 describes an exemplified tracker's terminal. Advantageously, it is a terminal of a cellular network 10, to which terminal a software application allowing the distribution of the telematic data according to the information, such as position information, has been installed. The terminal 13 exemplified in FIG. 2a can advantageously function either in a circuit switched digital cellular network 10b or in a packet switched digital cellular network 10a.

The data transmission network 10 described in FIG. 2a can be used in the transmission of the telematic data of an object 11a to be tracked to at least one tracker's terminal 13 through a circuit switched digital network 10b, reference numerals 12a, 100 and 13b. The digital network 10b can transmit for example text messages between the tracker's terminal 13 and the tracking device 12 of the object to be tracked 11b. A text message from the tracker's terminal 13 may comprise a request for positioning to the tracking device 12 of the object 11a to be tracked.

The tracking device 12 advantageously comprises a satellite locator. In the following, a GPS locator is used as an example of satellite locators. The device 12 carried by the object 11*a* to be tracked performs the positioning by means of GPS signals received by the receiver of the GPS locator. When the positioning has been performed in the tracking device 12, the tracking device 12 of the tracked object advantageously sends a text message to the tracker's terminal 13. This message advantageously contains the position information received by means of the GPS positioning.

In an advantageous embodiment of the invention, the position of the object 11*b* can also be defined by taking a bearing to the object from two or more positions by means of the carrier wave of the radio transmission of the object. In this case, it is possible to estimate the coordinates of the position obtained by taking bearings to the object 11*b*, which coordinates can be transmitted with the arrangement according to the invention also to the terminals that did not take bearings.

Advantageously, a text message also contains information as to whether or not the position information of the object is set to be distributed with the terminals of other trackers. This setting data can be set to the device to be tracked either beforehand or else it is transmitted together with the request for positioning to the device 12 of the object to be tracked.

A terminal 13 according to the invention advantageously comprises a software application by the use of which it is possible to distribute the position information received by the terminal 13 from the object to be tracked 11*a* with several other terminals 22 and 23. In the software application according to the invention, there is a setting on the basis of which it is possible to make a decision as to whether or not the position information of the object is distributed. If the distribution setting of the position information of the terminal 13 is on then the terminal 13 connects through a wireless data link 13*b* to a packet switched network 10*a*. The packet switched network 10*a* can for example be a GPRS network. Depending on the choice of the user of the terminal 13, the telematic data can be directed either directly to other terminals 22 and 23 through connections 200*a*, 200*b* and 200*c*, or to the server 21 through a permanent connection 21*a*. From the server 21, the telematic data is forwarded to the desired devices by using connections 200*b* and 200*c*.

Transmission of telematic data taking place through a separate server is more general, because only few operators offer direct connections in a GPRS network between two terminals. Storing the position information of the object to be tracked to the server 21 allows also to distribute the position information with countless other terminals and also to monitor the history records on the use of the position information.

In an advantageous embodiment of the invention, a terminal 13 also distributes its own position information with other terminals 22 and 23. In this embodiment, the software application according to the invention presents also a question on the display of the terminal 13: "Distribute own position?". If the user of the terminal 13 replies to this question "Distribute", then the terminal 13 sends its own position information by means of a wireless connection 13*b* through a packet switched network 10*a* to a server 21. Thereafter, the position information of the terminal 13 is available also to other terminals 22 and 23. Naturally, this can also be made as a one-time setting, in which case the own position is sent in a timed manner without any questions.

Since in the example of FIG. 2*a*, a GPRS connection is used for data transmission from the trackers' terminals 13, 22 and 23 to the cellular network 10*a*, the data transmission connections 13*b*, 22*b* and 23*b* are, in principle, switched on all the time. However, only the transmitted amount of data is paid for. Thus, with the arrangement according to the invention it is possible to influence how much the tracking of the object 11*a* will cost totally.

Furthermore, if several objects 11*a* to be tracked (not shown in FIG. 2) are being tracked with a terminal 13, then the storage of the tracking information to the server 21 is very advantageous. For each positioning result, only one text message is sent to the tracker's terminal 13 that sends the position information through a packet switched network 10*a* to a server 21. The server 21 advantageously forwards the information to each other tracking device 22 and 23 that requested for it.

It is to be noted that also the terminals 22 and 23 may contain devices and software required for receiving the telematic data directly from the object device 12*a* and for distributing this data. With this arrangement, no matter which terminal receives the position information from the device 12*a*, it is transmitted to all devices that have access to a packet data connection.

Figure 1A:
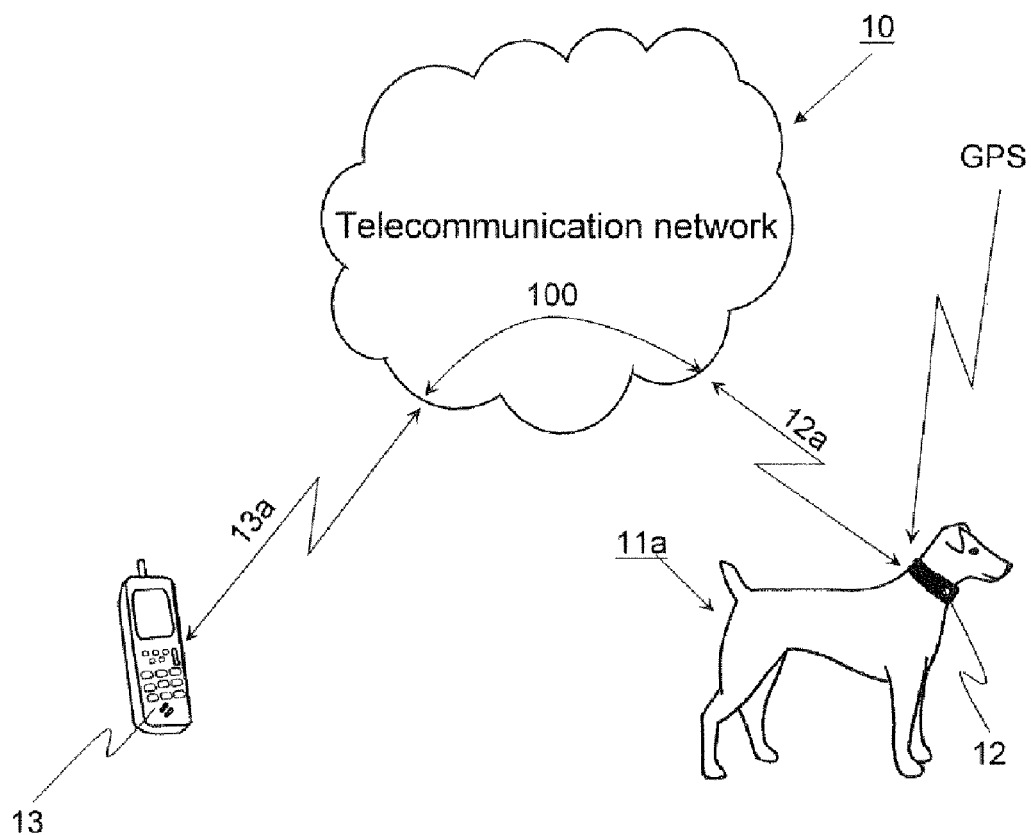
FIG. 1a shows a tracking arrangement according to the prior art.
Figure 1B:
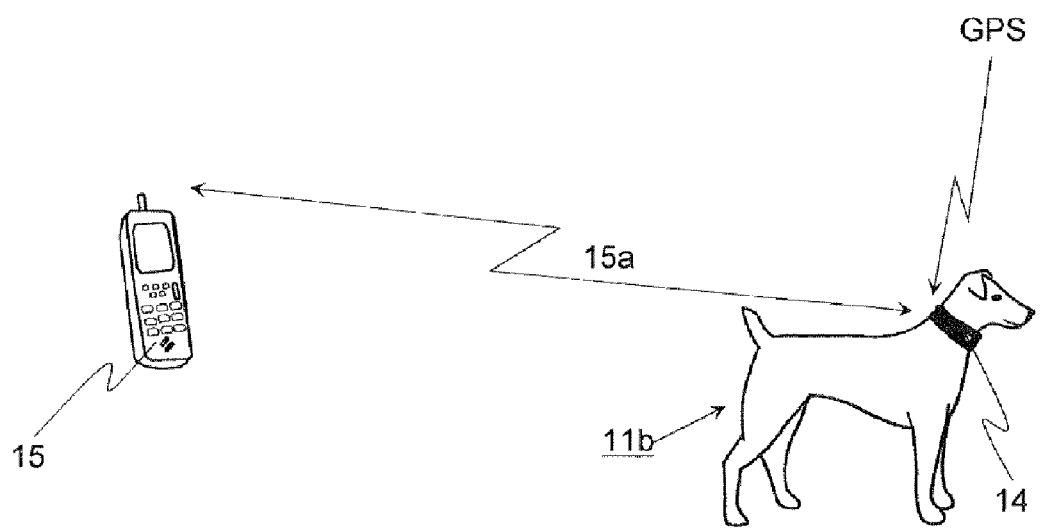
FIG. 1b shows another tracking arrangement according to the prior art.

It is possible to apply the invention also to the case of FIG. 1*b*. In this embodiment, the tracking device 14 carried by the object to be tracked 11*b* performs the positioning by using GPS signals. The positioning result is advantageously transmitted through an analogue radio link 15*a* to the tracker's terminal 15. The used radio link can be for example an FRS link using frequency modulations. The tracker's terminal 15 advantageously comprises means for sending and receiving through an FRS radio link. After having received the positioning information from the object to be tracked 11*b*, the tracker's terminal 15 can distribute the received the position information with other trackers' terminals 22 and 23 through some packet switched network 10*a*. Even in this 10 embodiment, the tracker's terminal uses the software application according to the invention, by means of which application the position information of the object to be tracked can be distributed to all willing receivers as described in connection with the description of FIG. 2*a*.

It is to be noted that in the case of RF link, also the terminals 22 and 23 may contain devices and software required for receiving the telematic data directly from the object device 12*a* and for distributing this data. With this arrangement, no matter which tracker receives the position information from the device 12*a*, it is transmitted to all devices that have access to a packet data connection. Advantageously, this arrangement allows transmitting the telematic data of the device to all users even though only one, possibly changing terminal hears the signal sent from the device 14.

Figure 2B:
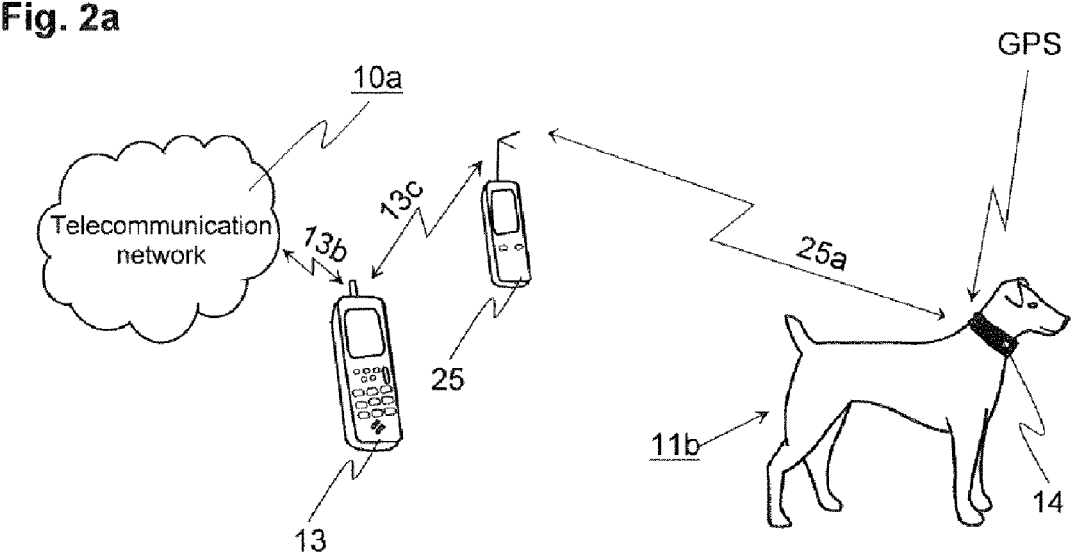
FIG. 2b shows by way of an example another tracking arrangement according to the invention.

It is possible to apply the invention also to the solutions shown in FIG. 2*b*, in which solutions the GPS locator carried by the object to be tracked 11*b* and the radio transmitter belonging to it transmit the telematic data to a separate RF transmitter-receiver 25 of the tracker. In this embodiment, the tracker's RF transmitter-receiver can advantageously take bearings to the RF transmission of the GPS locator of the object 11*b* in order to improve the strength of the received signal. The tracker's RF transmitter-receiver 25 can advantageously transmit the telematic data received from the object to be tracked by means of a low range radio link 13*c* or a cable to a cellular network terminal 13 that advantageously forwards 13*b* the telematic data through a packet switched network 10*a* to the used position information server 21 (shown in FIG. 2*a*).

Figure 3:
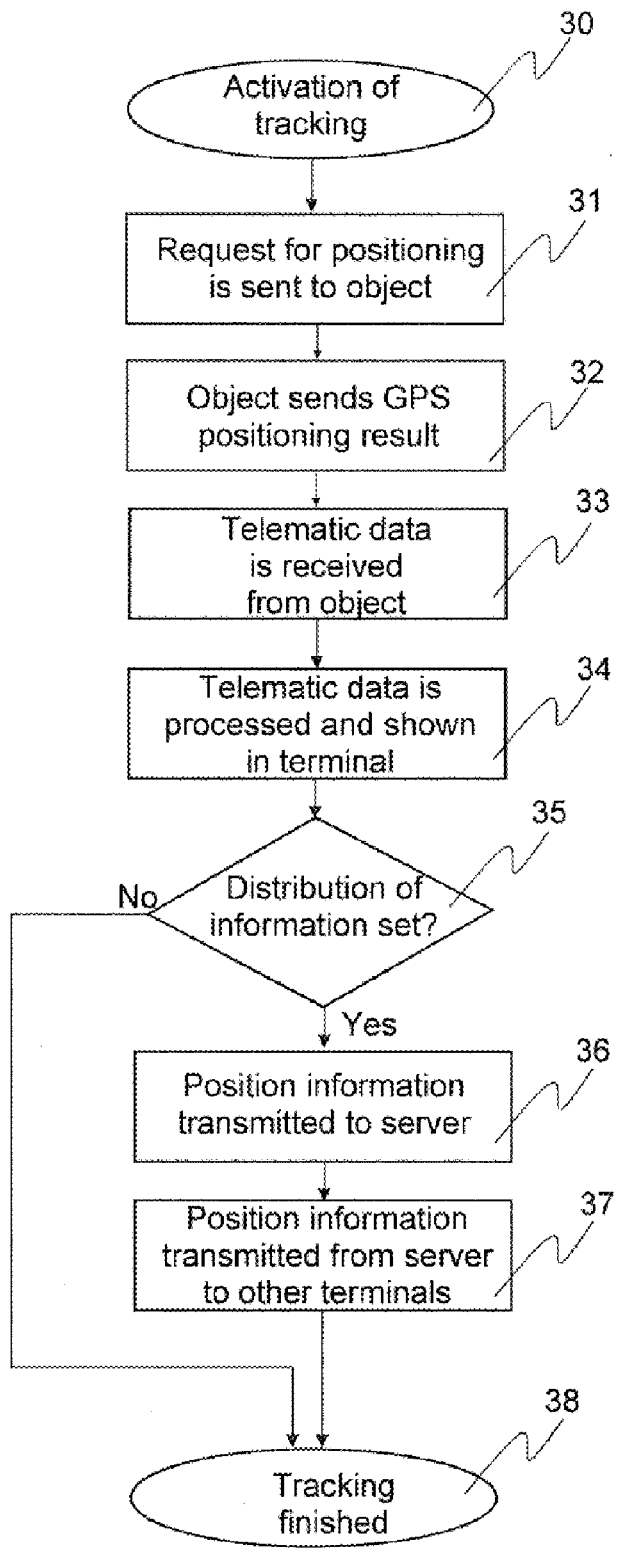
FIG. 3 shows by way of an exemplified flow chart the stages of a tracking method according to the invention.

In FIG. 3, the functional main stages required for distributing the position information according to the invention are shown as an exemplified flow chart.

Tracking is activated in stage 30 in the tracker's terminal 13 or 15. After the activation, in stage 31, the tracker's terminal 13 or 15 sends the request for positioning to the device 12 or 14 of the object 11*a* or 11*b* to be tracked. The request for positioning can be transmitted to the object 11*a* advantageously either as a text message or a data call through a cellular network 10b. The request for positioning can be transmitted to the object 11b also directly through a local closed radio link 15a.

In stage 32, the device of the object to be tracked performs the positioning by using the GPS satellite signals it has received. When the positioning has been performed, the device of the object to be tracked sends the result of positioning to the terminal that requested for positioning. In addition to the positioning information, information on whether the position information is set to be distributed with several trackers' terminals 22 and 23 is advantageously transmitted to the tracker's terminal.

In an advantageous embodiment according to the invention, the device 12 of the object to be tracked 11a sends through a cellular network a text message or establishes a data call to the tracker's terminal.

In another advantageous embodiment according to the invention, the position information is transmitted from the positioning device 14 of the object 11b through a local closed radio link to the tracker's terminal 15.

In stage 33, the tracker's terminal 13 or 15 receives the telematic message containing the position information sent by the object 11a or 11b.

In stage 34, the terminal deciphers and processes the information of the received message. From the data of the message, the terminal separates the position information of the object to be tracked and eventual information relating to the distribution of the position information. Advantageously, the received position information is presented on the display of the terminal 13 or 15.

In stage 35, the terminal checks if the received position information is set to be distributed with other trackers' terminals 22 and 23. If the position information is not set to be distributed, the tracking ends in stage 38.

If, in the check-up in stage 35, it is noted that the received position information contains the distribution setting of the position information as a supplementary information, then in stage 36, the terminal 13 or 15 transmits the received position information through a packet switched network 10a to a suitable server 21. The server 21 distributes the position information of the object to be tracked 11a or 11b that it has received to other trackers' terminals 22 and 23. When the position information has been transmitted from the terminal 13 or 15 to the server 21, the tracking ends in stage 38.

In an advantageous embodiment, a tracker's terminal 13 or 15 distributes also its own position information in a corresponding manner.

Any of the method steps described or illustrated herein may be implemented using executable instructions in a general-purpose or special-purpose processor and stored on a computer-readable storage medium (e.g., disk, memory, or the like) to be executed by such a processor. References to 'computer-readable storage medium' and 'computer' should be understood to encompass specialized circuits such as field-programmable gate arrays, application-specific integrated circuits (ASICs), USB flash drives, signal processing devices and other devices.

Figure 4:
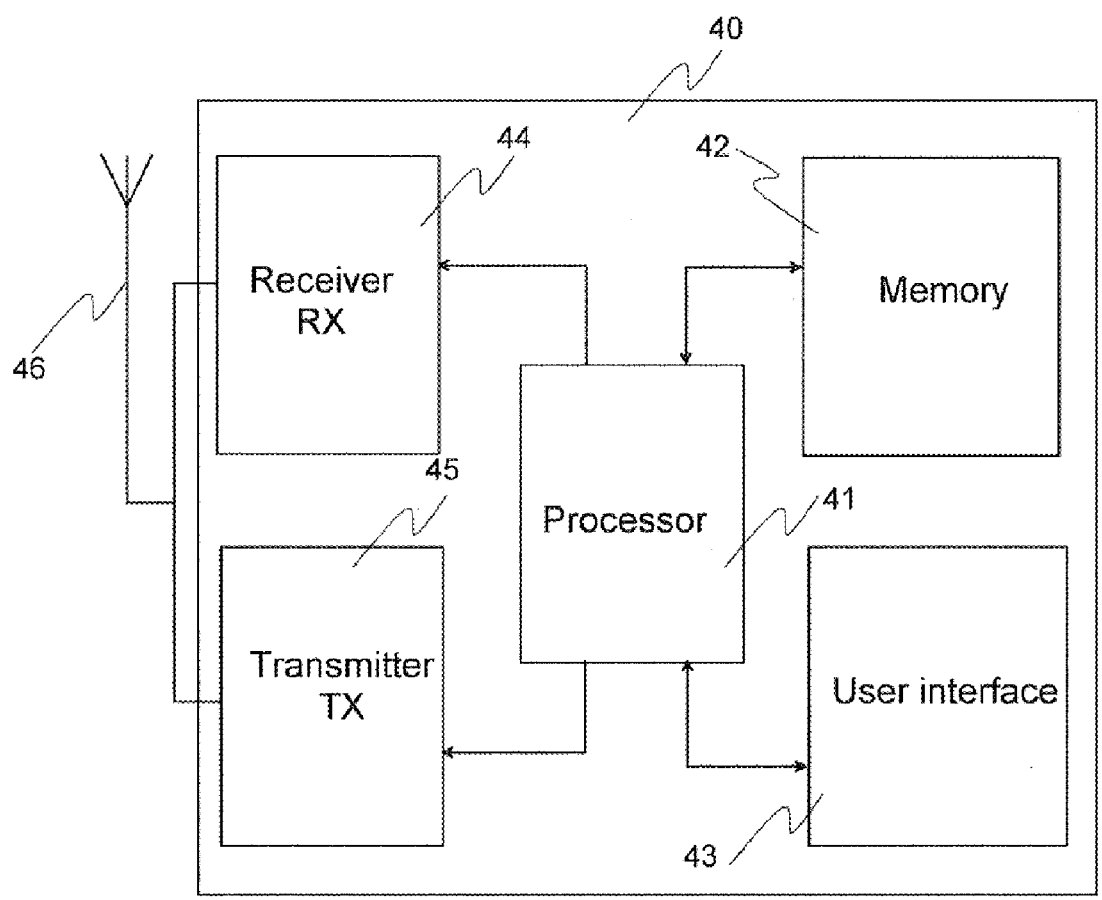
FIG. 4 shows by way of an example the functional main parts of a tracker's device.

FIG. 4 shows by way of an example a wireless terminal 40 according to the invention used by a tracker. The terminal 40 uses an antenna 46 for the transmission and the reception in different wireless data transmission networks 10, 10a, 10b, 15a. Reference numeral 44 shows a receiver RX of the terminal 40. The receiver RX comprises means according to the prior art for all receivable messages or signals. The receiver is able to receive signals as well from circuit switched 10b as also packet switched digital networks 10a. Advantageously, the receiver also comprises means for receiving a signal through an analogue or digital local radio link 15a.

Reference numeral 45 shows a transmitter TX of the terminal 40. The transmitter 45 comprises means for operations to be performed on the signal to be transmitted. The transmitter 45 comprises transmitter means for both a circuit switched 10b and a packet switched digital wireless network 10a. Advantageously, the transmitter 45 also comprises means for sending the signal through an analogue radio link 15a.

The functional main parts in a terminal 13 or 15 as to the use of the invention are in addition a processor unit 41 controlling its functioning as well as a memory 42 to which the software application required for the implementation of the method for distributing the position information according to the invention has advantageously been stored. The terminal 13 or 15 requires also a SIM card (not shown in FIG. 2) in order to function, since it is used in a cellular network 10 according to prior art, such as a GSM/GPRS network.

In advantageous embodiment according to the invention, the processor unit 41 of the terminal 40 can distribute the position information received by the terminal 40 or its own position information for example through a GPRS network 10a directly to other trackers' terminals 22 and 23. In this embodiment, a specific server 21 for storing the position information is not needed.

By means of a user interface 43 of the terminal 40, the tracker of the object 11a or 1b controls the tracking event. In the beginning of the tracking process, the software application according to the invention shows the settings related to distribution of the position information on the display belonging to the user interface. By means of the user interface, the tracker can distribute the desired information with other trackers. Through the user interface, it is possible to determine also when a new request for positioning is sent to the tracking device 12 or 14 of the object to be tracked 11a or 11b.

The method stages described above in FIG. 3 are advantageously implemented by means of a software application that is stored to the memory 42 of the terminal 40. The processor unit 41 of the terminal 40 performs the operations required by the software application, by means of which operations the distribution of the position information can be performed.

Some advantageous embodiments of the method for distributing the position information and the terminal according to the invention have been described above. The invention is not limited to the above described exemplified embodiments. The object to be tracked can for example be any movable object, such as a car or a freight shipment, in addition to a living object. In addition, the inventive idea can be applied in numerous ways within the scope of the claims.

The invention claimed is:

1. A method for distributing telematic data sent by a tracking device attached to a living object, the method comprising:
   positioning the living object by a GPS locator included in the tracking device;
   sending, from the tracking device of the living object, the position information through a point-to-point radio connection to a wireless terminal of a tracker;
   displaying, on a display of the wireless terminal of the tracker, position information contained in the telematic data received from the tracking device of the living object;
   checking, at the wireless terminal of the tracker, whether the received position information is set to be forwarded; and
   forwarding the received position information of the living object through a packet switched network to at least one other wireless terminal if the position information of the living object is set to be distributed,
wherein the position information is distributed by transmission from the wireless terminal to a server connected to a packet switched network, said server configured to transmit the position information of the living object to the at least one other terminal that requested the position information.

2. The method according to claim 1, further comprising:
determining, at the wireless terminal, whether the position information of the wireless terminal is distributed with at least one other wireless terminal.

3. The method according to claim 1, wherein the living object is positioned by means of satellite positioning.

4. The method according to claim 1, wherein the position information of the living object is transmitted in a circuit switched network by means of a text message.

5. The method according to claim 1, wherein the position information is sent from the wireless terminal of the tracker through a packet switched network to the at least one other wireless terminal that requested the position information.

6. A data storage medium encoded with software readable by a data processing device for executing all the steps of the method defined in claim 1 when said software is run on a processor.

7. An arrangement for positioning a living object, comprising:
a combined satellite positioning and data transmission device configured to be carried by a living object, the combined device configured for point-to-point radio communication, the combined satellite positioning and data transmission device being further configured to position the geographical position of the living object by a GPS locator and to send telematic data including a GPS position of the combined satellite positioning and data transmission device to a wireless terminal of the tracker; and
a terminal device of a tracker of the living object, comprising i) a terminal operating through point-to-point radio communication, ii) the wireless terminal configured to operate through a packet switched data transmission link and a display,
wherein the wireless terminal of the tracker comprises
means for setting the received GPS position information to be distributed with at least one other wireless terminal, and
means for forwarding the received GPS position information of the living object through a packet switched network to at least one other wireless terminal, if the position information of the living object is set to be distributed, and
wherein the position information is configured to be sent from the wireless terminal of the tracker to a server connected to a packet switched network, said server configured to forward the position information of the living object to a requesting wireless terminal that requested the position information.

8. The positioning arrangement according to claim 7, wherein the position information is arranged to be transmitted through point-to-point radio connection as one of a text message or a data call.

9. The positioning arrangement according to claim 7, wherein the position information is sent from the wireless terminal of the tracker through a packet switched network to another wireless terminal that requested the position information.

10. The positioning arrangement according to claim 9, wherein the packet switched network is a GPRS network.

11. The positioning arrangement according to claim 7, wherein the packet switched network is a GPRS network.

12. The positioning arrangement according to claim 7, wherein the used point-to-point radio connection is one of a communications link established through a GSM network or a direct radio link.

13. A wireless terminal of a radio network, comprising:
a receiver for receiving telematic data including a GPS position result from a tracking device attached to a living object to be tracked, the telematic data received through a point-to-point radio connection;
a processor unit for checking whether a GPS position information contained in the received telematic data is configured to be distributed to at least one other wireless terminal; and
a transmitter for forwarding the GPS position information contained in the received telematic data of the living object through a packet switched network to at least one other wireless terminal,
wherein the transmitter is configured to distribute GPS position information to a server connected to the packet switched network, said server configured to transmit the GPS position information of the living object to the at least one other wireless terminal upon request by the one other wireless terminal.

14. The terminal according to claim 13, further comprising:
means for distributing an information of a position of the wireless terminal.

15. The terminal according to claim 14, further comprising:
means for selecting the position information to be distributed by means of a user interface of the wireless terminal.

16. The terminal according to claim 13, further comprising:
means for selecting the position information to be distributed by means of a user interface of the wireless terminal.

17. The terminal according to claim 16, further comprising:
means for sending the selected position information through a packet switched network to at least one other wireless terminal.

18. The terminal according to claim 13, further comprising:
means for sending the position information to a server.

* * * * *